(12) United States Patent
Tremblay et al.

(10) Patent No.: US 11,981,060 B2
(45) Date of Patent: May 14, 2024

(54) THERMOPLASTIC ENCAPSULATED THERMAL IMAGING SYSTEMS AND METHODS

(71) Applicant: Teledyne FLIR Commercial Systems, Inc., Goleta, CA (US)

(72) Inventors: Marcel Tremblay, Goleta, CA (US); Jace Dispenza, Golden, CO (US)

(73) Assignee: Teledyne FLIR Commercial Systems, Inc., Goleta, CA (US)

(*) Notice: Subject to any disclaimer, the term of this patent is extended or adjusted under 35 U.S.C. 154(b) by 19 days.

(21) Appl. No.: 17/504,460

(22) Filed: Oct. 18, 2021

(65) Prior Publication Data
US 2023/0117817 A1 Apr. 20, 2023

(51) Int. Cl.
*B29C 45/14* (2006.01)
*B29C 45/00* (2006.01)
*B29K 77/00* (2006.01)
*B29L 31/30* (2006.01)
*B29L 31/34* (2006.01)

(52) U.S. Cl.
CPC .... *B29C 45/14778* (2013.01); *B29C 45/0001* (2013.01); *B29C 45/14639* (2013.01); *B29K 2077/00* (2013.01); *B29L 2031/30* (2013.01); *B29L 2031/3481* (2013.01)

(58) Field of Classification Search
CPC .............................................. B29C 45/14639
See application file for complete search history.

(56) References Cited

U.S. PATENT DOCUMENTS

| 6,752,951 | B2* | 6/2004 | Meek .................... | H04N 23/51 |
| | | | | 348/E5.029 |
| 2017/0245370 | A1* | 8/2017 | Wang ................ | B29C 45/14639 |
| 2017/0264804 | A1* | 9/2017 | Wang .................... | H04N 23/45 |

FOREIGN PATENT DOCUMENTS

CN 108995144 * 12/2018

OTHER PUBLICATIONS

Henkel Loctite Technomelt—Jun. 1, 2021 [Downloaded at: https://www.henkel.com/resource/blob/1222450/7ddc41d199c77cb92545f9d67be769ff/data/2021-06-01-press-release-henkels-technomelt-low-pressure-molding-technology-meets-latest-demands-for-encapsulation-of-electronics-and-medical-components.pdf].
MoldMan Systems—Mold-Man 2050—Feb. 2019 [Downloaded at: moldmansystems.com.

* cited by examiner

*Primary Examiner* — Edmund H Lee
(74) *Attorney, Agent, or Firm* — Haynes and Boone, LLP

(57) ABSTRACT

Various techniques are provided to enclose at least a portion of a thermal imaging system in a thermoplastic material to create a waterproof thermal imaging system and encapsulate associated electrical components. In one example, a method includes placing at least a portion of a thermal imaging system comprising a plurality of exposed electronic components into a mold. The method also includes injecting a thermoplastic material into the mold to deposit the thermoplastic material onto the electronic components and encapsulate the electronic components in an overmolded solid enclosure formed by the thermoplastic material. Additional methods and systems are also provided.

19 Claims, 6 Drawing Sheets

THERMOPLASTIC ENCAPSULATED THERMAL IMAGING SYSTEMS AND METHODS

TECHNICAL FIELD

The present invention relates generally to imaging and, more particularly, to thermal imaging systems for use in harsh environments.

BACKGROUND

Thermal imaging systems are used in a variety of applications to capture images of thermal wavelengths. For example, thermal imaging systems may be implemented as thermal cameras for use with vehicles such as cars, trucks, aerial vehicles, watercraft, and others. However, these implementations typically expose the thermal cameras to harsh environmental conditions such as extreme temperatures, rain, snow, moisture, and/or other conditions.

Conventional thermal cameras are typically implemented with hollow housings that enclose various electronic components. Unfortunately, such implementations have drawbacks. For example, a housing must be configured to fit over the electronic components and associated heatsinks, thus adding size and bulk to a thermal camera. Such implementations typically require sufficient air gaps to be provided between the enclosed electronic components to facilitate cooling. In addition, seals must be maintained between the housing and other portions of the camera to remain waterproof. Air disposed with an interior cavity formed by the housing is repeatedly heated and cooled as the camera is exposed to various environmental conditions that typically require the inclusion of a vent to pass the air between the interior cavity and the external environment as air pressure changes. Thus, it will be appreciated that conventional housings result in various complications in the design, manufacture, and operation of thermal cameras.

SUMMARY

Various techniques are disclosed to enclose at least a portion of a thermal imaging system in a thermoplastic material to create a waterproof thermal imaging system and encapsulate associated electrical components. The thermoplastic material may be comprised of polyamides, polyolefins, or the like, which protect the electronic assembly of the thermal imaging system and create a waterproof, rugged, and corrosion resistant thermal imaging system for use in extreme environmental conditions. The use of thermoplastic material eliminates the need for a separate housing to enclose the various electronic components and associated features (e.g., circuit boards, frames, structural members, and/or other features) of the thermal imaging system.

In one embodiment, a method includes placing at least a portion of a thermal imaging system comprising a plurality of exposed electronic components into a mold; and injecting a thermoplastic material into the mold to deposit the thermoplastic material onto the electronic components and encapsulate the electronic components in an overmolded solid enclosure formed by the thermoplastic material.

In another embodiment, a thermal imaging system includes a plurality of electronic components; and an overmolded solid enclosure that encapsulates the electronic components, wherein the overmolded solid enclosure is formed by an injection of thermoplastic material into a mold.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
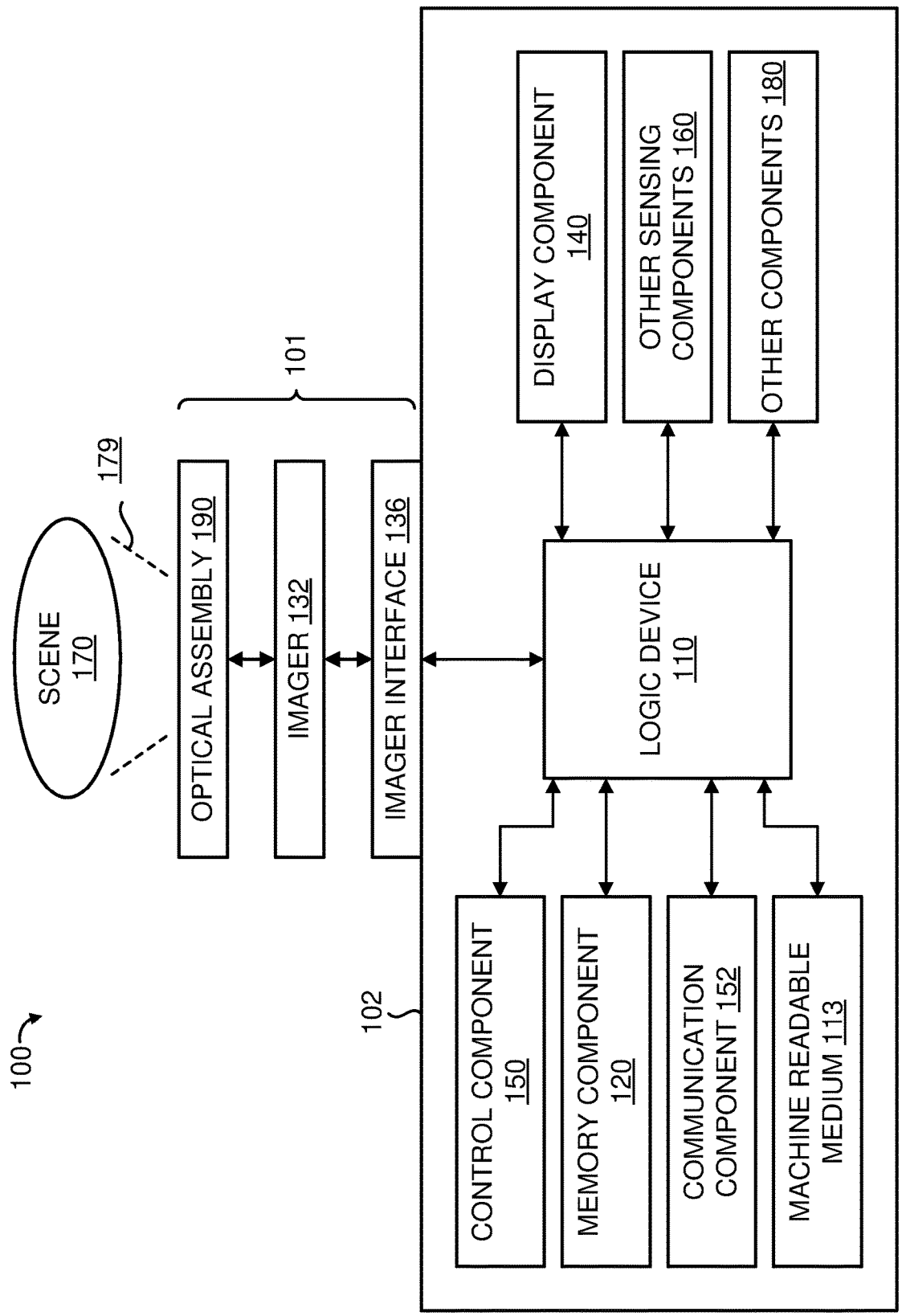
FIG. 1 illustrates a block diagram of a thermal imaging system in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology.

In one or more embodiments, various systems and methods are provided. In some aspects, such systems and methods may be used for infrared imaging, such as thermal imaging. Such thermal imaging may be used for various applications, such as safety and vehicular (e.g., automotive) applications.

Conventional thermal imaging systems have drawbacks, such as reduced thermal performance due to thermal imaging system housings, confining external housing connections, excessive moisture accumulation within the housings, and additional space required between the housings and enclosed electronic components. In order to provide a thermal imaging system that addresses these issues, embodiments of the present invention overmold electronic components of the thermal imaging system in thermoplastic material thereby creating a thermal imaging system that protects the electronic components and creates a waterproof, rugged, and corrosion-resistant thermal imaging system for use in extreme environmental conditions (e.g., particularly in vehicle-based systems where highly resilient and reliable systems are desirable for use in a wide range of temperatures, moisture levels, and other environmental conditions).

At least a portion of an assembled thermal imaging system is placed into a single or multi-cavity mold and overmolded in thermoplastic material, thus providing a waterproof enclosure that eliminates air gaps that may be a point of potential condensation over extreme environmental exposure and may lead to malfunction. The thermoplastic overmold further increases thermal performance, reduces tolerance issues associated with external connections, provides shock and vibration resistance, and reduces the size of the thermal imaging system by eliminating space that would otherwise be required to accommodate a conventional housing.

Turning now to the drawings, FIG. 1 illustrates a block diagram of a thermal imaging system 100 in accordance with an embodiment of the disclosure. Thermal imaging system 100 may be used to capture and process thermal images (e.g., thermal image frames). In some embodiments, thermal imaging system 100 may be implemented as a thermal camera 200 as shown in additional drawings. In some embodiments, one or more components of thermal imaging system 100 may be implemented remotely from each other in a distributed fashion (e.g., networked or otherwise).

As shown, thermal imaging system 100 includes a first portion 101 including an optical assembly 190, an imager 132, and an imager interface 136. Thermal imaging system 100 also includes a second portion 102 (e.g., also referred to as a components section) with various electronic components including logic device 110, machine readable medium 113, memory component 120, display component 140, control component 150, communication component 152, other sensing components 160, and other components 180 (e.g., additional components such as one or more circuit boards, heatsinks, and/or other components as appropriate).

In various embodiments, second portion 102 may be implemented as an overmolded solid enclosure formed by a thermoplastic material as further discussed herein. In this regard, one or more of the components of second portion 102 may be provided partially or entirely within the overmolded solid enclosure (e.g., partially or entirely encapsulated by the thermoplastic material). In some embodiments, some components of the second portion 102 may be external to the overmolded solid enclosure.

In various embodiments, thermal imaging system 100 may be implemented, for example, as a camera system such as a portable handheld camera system, a small form factor camera system implemented as part of another device, a fixed camera system, and/or other appropriate implementations. In various embodiments, thermal imaging system 100 may be handheld or mounted to a vehicle, such as a car, truck, aerial vehicle, watercraft, etc.

In some embodiments, logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of processing device and/or memory to execute instructions to perform appropriate operations. Logic device 110 is configured to interface and communicate with the various components illustrated in FIG. 1. In various embodiments, it should be appreciated that processing operations and/or instructions may be integrated in software and/or hardware as part of logic device 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of thermal imaging system 100 and/or separate from thermal imaging system 100, with stored instructions provided to thermal imaging system 100 by coupling the machine readable medium 113 to thermal imaging system 100 and/or by thermal imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is configured to execute software stored in memory component 120 and/or machine readable medium 113 to perform various methods, processes, and operations in a manner as described herein.

In some embodiments, imager 132 may include an array of sensors (e.g., any type visible light, infrared, or other type of detector) for capturing images of scene 170. In one embodiment, the sensors of imager 132 provide for representing (e.g., converting) a captured images of scene 170 as digital data (e.g., via an analog-to-digital converter included as part of the sensor or separate from the sensor as part of thermal imaging system 100). Imager interface 136 provides the captured images to logic device 110 which may be used to process the image frames, store the original and/or processed image frames in memory component 120, and/or retrieve stored image frames from memory component 120.

In some embodiments, logic device 110 may be configured to receive images from imager 132, process the images, store the original and/or processed images in memory component 120, and/or retrieve stored images from memory component 120. In various aspects, logic device 110 may be configured to receive images from imager 132 via wired or wireless communication with imager interface 136. Logic device 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Logic device 110 may be configured to display image data and information on display component 140. Logic device 110 may be configured to retrieve image data and information from memory component 120 and display any retrieved image data and information on display component 140. Display component 140 may include display electronics, which may be utilized by logic device 110 to display image data and information. Display component 140 may receive image data and information directly from imager 132 via logic device 110, or the image data and information may be transferred from memory component 120 via logic device 110.

In some embodiments, control component 150 may include a user input and/or interface device having one or more user actuated components, such as one or more push-buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Logic device 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of thermal imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, thermal imaging system 100 may include one or more other types of sensing components 160, including environmental and/or operational sensors, depending on the sensed application or implementation, which provide information to logic device 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), rotation (e.g., a gyroscope), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by imager 132.

In some embodiments, other sensing components 160 may include devices that relay information to logic device 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a connector (e.g., to interface one or more electronic components to an external device), a network interface component (NIC) configured for communication with a network including other devices in the network, and/or other implementations. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, thermal imaging system 100 and/or its individual associated components may be associated with a particular network link such as for example a URL (Uniform Resource Locator), an IP (Internet Protocol) address, and/or a mobile phone number.

Figure 2:
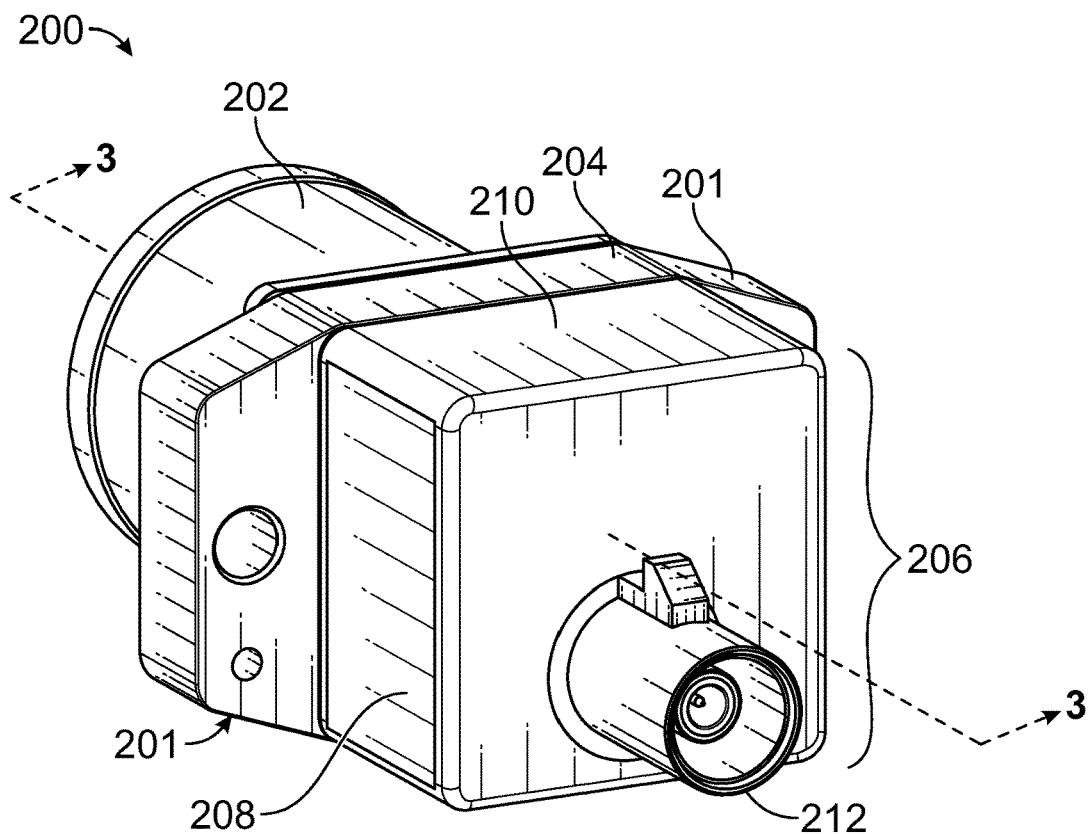
FIG. 2 illustrates an external view of a thermal imaging system implemented as a thermal camera in accordance with an embodiment of the disclosure.
Figure 3:
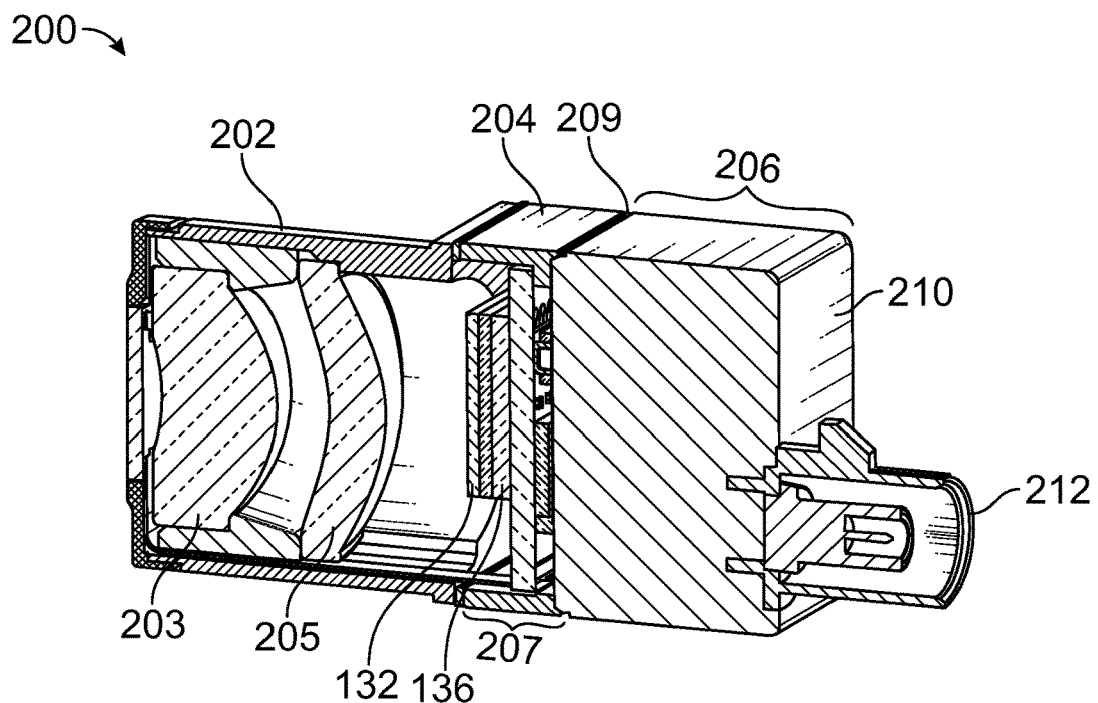
FIG. 3 illustrates a cross-sectional view of the thermal camera of FIG. 2, as seen along the lines of the section 3-3 taken therein, in accordance with an embodiment of the disclosure.
Figure 4:
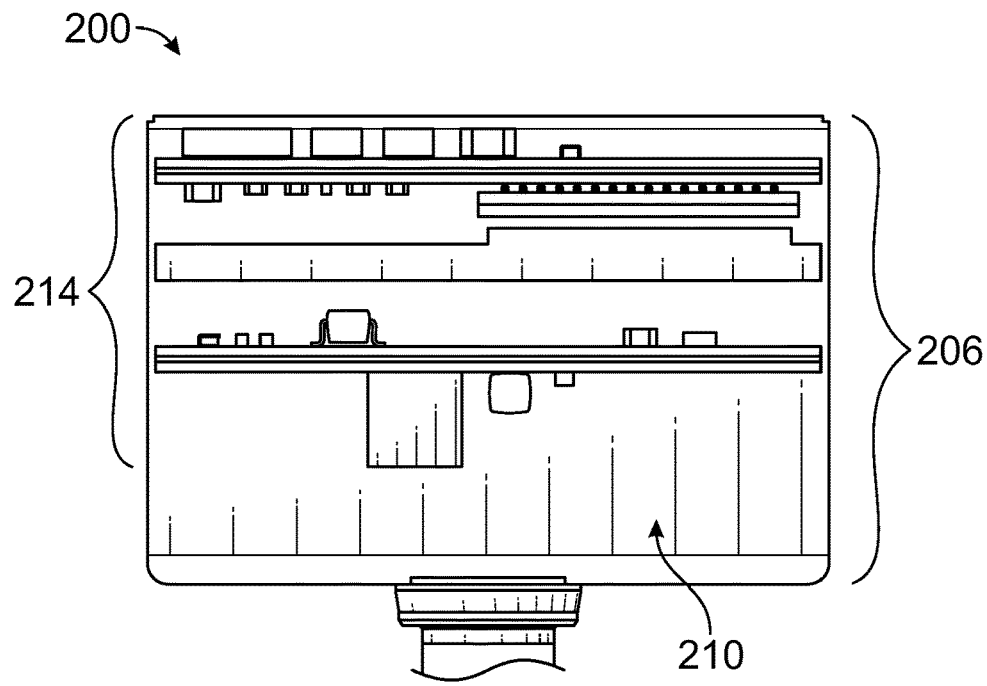
FIG. 4 illustrates an overmolded solid enclosure of the cross-sectional view of FIG. 3 in accordance with an embodiment of the disclosure.

FIG. 2 illustrates an external view of a thermal camera 200 used to implement thermal imaging system 100 in accordance with an embodiment of the disclosure. FIG. 3 illustrates a cross-sectional view of thermal camera 200 of FIG. 2, as seen along the lines of the section 3-3 taken therein, in accordance with an embodiment of the disclosure. FIG. 4 illustrates an overmolded solid enclosure of the cross-sectional view of FIG. 3 in accordance with an embodiment of the disclosure.

As shown, thermal camera 200 includes a lens barrel 202, an intermediate housing 204, and an overmolded solid enclosure 206. In this regard, lens barrel 202 and intermediate housing 204 may collectively correspond to first portion 101 of FIG. 1 and overmolded solid enclosure 206 may correspond to second portion 102 of FIG. 1.

Lens barrel 202 includes various optical components (e.g., lenses) 203 and 205 that collectively correspond to optical assembly 190 of FIG. 1. Intermediate housing 204 encloses imager 132, imager interface 136, and other components provided as part of a circuit board stackup 207. Intermediate housing 204 also provides various mounting features 201 to facilitate installing thermal camera 200 to a desired location. Overmolded solid enclosure 206 is formed with a thermoplastic material 210 that is overmolded on and encapsulates various electronic components and associated circuit boards 214 (see FIG. 4), such as any of the components of second portion 102 of FIG. 1.

As shown in FIGS. 3 and 4, thermoplastic material 210 fills all available space within overmolded solid enclosure 206 (e.g., filling cavities between electronic components and associated circuit boards 214). Various types of thermoplastic material 210 may be used. In some embodiments, thermoplastic material 210 may be a polyamide and/or a polyolefin that provide greater thermal conductivity and greater electrical insulation than air. In some embodiments, thermoplastic material may be Technomelt PA 6481 black available from Henkel Corporation of Briedgewater, New Jersey.

At least a portion of thermal camera 200 may be placed into a mold (e.g., a single cavity mold, multi-cavity mold, etc.) and heated thermoplastic material 210 is injected at a low pressure (e.g., less than 50 bars, less than 200 pounds per square inch (psi), in a range of 50 psi to 200 psi, or at approximately 100 psi) into the mold such that the thermoplastic material 210 fills the spaces between and around electronic components and associated circuit boards 214. That is, injecting the thermoplastic material 210 at low pressure allows the thermoplastic material 210 to surround electronic components and associated circuit boards 214 while preventing the electronic components and associated circuit boards 214 from being displaced during the injecting. The injected thermoplastic material 210 is at a temperature range (e.g., 200 degrees C. to 240 degrees C.) that allows the thermoplastic material 210 to flow around the electronic components but without damaging electronic components and associated circuit boards 214 or their associated connections (e.g., solder joints). As also shown in FIG. 3, a nonporous membrane 209 may be provided that prevents the injected thermoplastic material 210 from flowing into intermediate housing 204 or lens barrel 202.

The use of thermoplastic material 210 also eliminates seal joints that would otherwise be required to be sealed by various sealing members such as gaskets, O-rings, glue joints, and the like in conventional thermal imaging systems using external enclosures. Indeed, in some cases, such conventional seal joints may require compression of the sealing members in a direction perpendicular to the direction in which a conventional housing is attached or inserted. The use of thermoplastic material 210 eliminates such manufacturing complications.

One issue with conventional thermal imaging systems is the implementation of a heatsink used to dissipate heat from electronic components. In conventional implementations, the heatsink is required to be small so that an external enclosure fits over the electronic components and the heatsink. By covering such a conventional heatsink with the external enclosure, the thermal dissipation of the conventional heatsink is decreased. In addition, air gaps may exist between various electronic components and a conventional heatsink.

In contrast, thermal camera 200 includes a heatsink 208 that is exposed to the external environment. In this regard, at least a portion of heatsink 208 may be sealed by thermoplastic material 210 and therefore operate as both a heatsink 208 and also as a portion of the external surface of overmolded solid enclosure 206. As a result, the size of heatsink 208 may be increased in comparison to conventional housing-based implementations. Heatsink 208 is overmolded with thermoplastic material 210 which creates a seal around at least a portion of the heatsink 208 thereby exposing the heatsink 208 to the external environment while maintaining the waterproof seal around electronic components and associated circuit boards 214 within overmolded solid enclosure 206. In some embodiments, this exposure of heatsink 208 to the external environment may result in reduced internal temperatures of up to 10 degrees C. without compromising sealing or waterproof performance.

Moreover, thermoplastic material 210 provides improved thermal conductivity for thermal dissipation. In this regard, thermoplastic material 210 provides improved thermal conductivity greater than air. For any of electronic components and associated circuit boards 214 that are not in direct contact with heatsink 208 (e.g., and would otherwise be required to rely on thermal dissipation through air in a housing-based implementation), thermoplastic material 210 provides an effective and continuous medium to provide thermal dissipation from the electronic components and associated circuit boards 214 to the heatsink 208 exposed on the external surface of thermal camera 200 (e.g., providing thermal dissipation from electronic components and associated circuit boards 214 to heatsink 208 even if they are not in direct contact therewith).

Another issue with conventional thermal imaging systems is their strict tolerance requirements. For example, when coupling an external housing to a conventional thermal imaging system, an external connector on the external housing may be required to align precisely with the location of an internal connector interface of an internal circuit board.

In contrast, overmolded solid enclosure 206 encapsulates at least a portion of a connector 212 (e.g., a Fakra coaxial connector) corresponding to communication component 152 of FIG. 1. As such, connector 212 may be positioned at any location on an internal circuit board that is encapsulated by thermoplastic material 210. This overmold implementation secures connector 212 to thermal camera 200 and eases tolerance requirements by permitting connector 212 to be attached directly to the internal circuit board (e.g., rather than on an external housing and connected electrically through an intermediate electrical interface or aligned through an aperture in an external housing that must be further sealed).

Still another issue with conventional thermal imaging systems concerns changes in air temperature. Internal air temperature can rapidly decrease when the traditional thermal imaging system is suddenly exposed to, for example, a cold rain which create a vacuum (e.g., negative pressure). The vacuum pressure draws the moisture into the camera through, for example, rubber seals, O-rings, etc. In conventional thermal imaging systems, a breathable vent (e.g., a gore vent) is provided that eliminates the potential pressure deferential created during such environmental temperature fluctuations. However, the bigger the internal air volume is, the more moisture will be contained.

In contrast, overmolded solid enclosure 206 reduces the internal air volume and avoids the need for a vent to pass air between the electronic components within overmolded solid enclosure 206 and the external environment. As a result, size and complexity can be reduced.

Overmolded solid enclosure 206 provides additional size and space savings. In particular, the use of overmolded solid enclosure 206 can reduce the size and bulk associated with conventional housings. For example, conventional thermal imaging systems typically require sufficient clearance for an external housing to be positioned over the various electronic components and associated circuit boards during manufacture and assembly. This can result in a larger than desired housing and overall increased size of the conventional thermal camera.

In contrast, overmolded solid enclosure 206 effectively provides various external surfaces of thermal camera 200 (e.g., in combination with heatsink 208 in some embodiments). Because solid enclosure 206 is formed by injection molding of thermoplastic material 210, additional clearance space normally associated with conventional housings is not required as the thermoplastic material 210 is molded around the electronic components thereby eliminating the clearance space and also reducing the wall thickness in comparison with conventional thermal cameras.

In addition, because overmolded solid enclosure 206 can be formed in a single injection molding operation (e.g., see block 606 of FIG. 6 further discussed herein), thermal camera 200 can be manufactured with reduced complexity and performed more rapidly than conventional approaches that would otherwise require precise alignment of a conventional housing.

Figure 5:
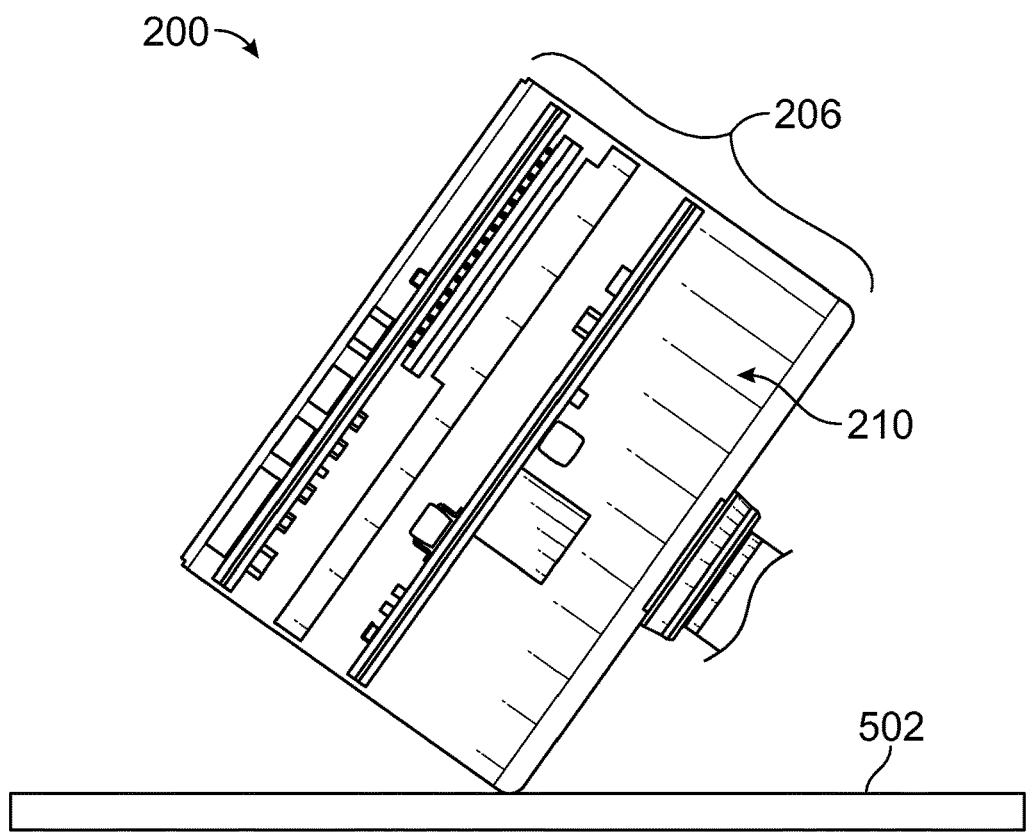
FIG. 5 illustrates a thermal camera contacting a hard surface in accordance with an embodiment of the disclosure.

Another advantage of overmolded solid enclosure 206 is that the thermoplastic material 210 provides improved robustness during shock events. For example, as illustrated in FIG. 5, when thermal camera 200 contacts a hard surface 502, thermoplastic material 210, which is softer than housings used with conventional thermal imaging systems, provides shock absorption and protects electronic components and associated circuit boards 214 within overmolded solid enclosure 206.

In addition, thermoplastic material 210 provides sufficient insulation and heat dissipation to permit thermal camera 200 to be operated over a wide range of temperatures, such as over a temperature range of at least −40 degrees C. to at least +85 degrees C. suitable for automotive implementations.

Thus, it will be appreciated that various embodiments disclosed herein may be used to provide thermal imaging system 100, such as thermal camera 200, with overmolded solid enclosure 206 that protects enclosed electronic components and creates a waterproof, rugged, and corrosion resistant thermal imaging system for use in extreme environmental conditions. The overmolded solid enclosure 206 further increases thermal performance, reduces tolerance issues associated with external connections, provides shock and vibration resistance, and reduces size.

Figure 6:
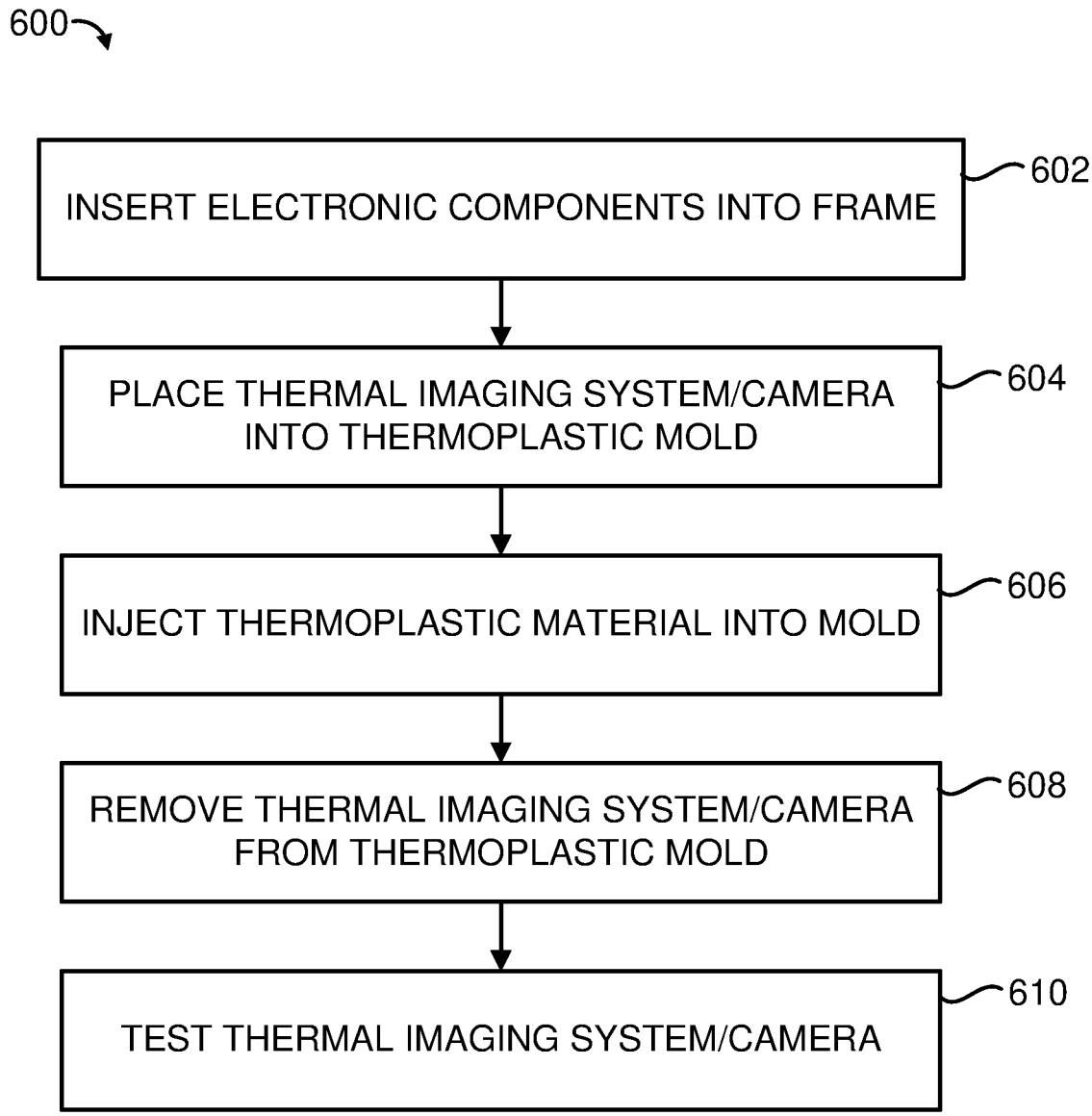
FIG. 6 illustrates a flow diagram of an example process for manufacturing a thermal imaging system implemented as a thermal camera in accordance with an embodiment of the disclosure.

FIG. 6 illustrates a flow diagram of a process 600 for manufacturing thermal imaging system 100 in accordance with an embodiment of the disclosure. For explanatory purposes, process 600 is primarily described herein with reference to thermal camera 200 and its associated arrangement of components. However, the process 600 is not limited to such implementations.

Figure 7:
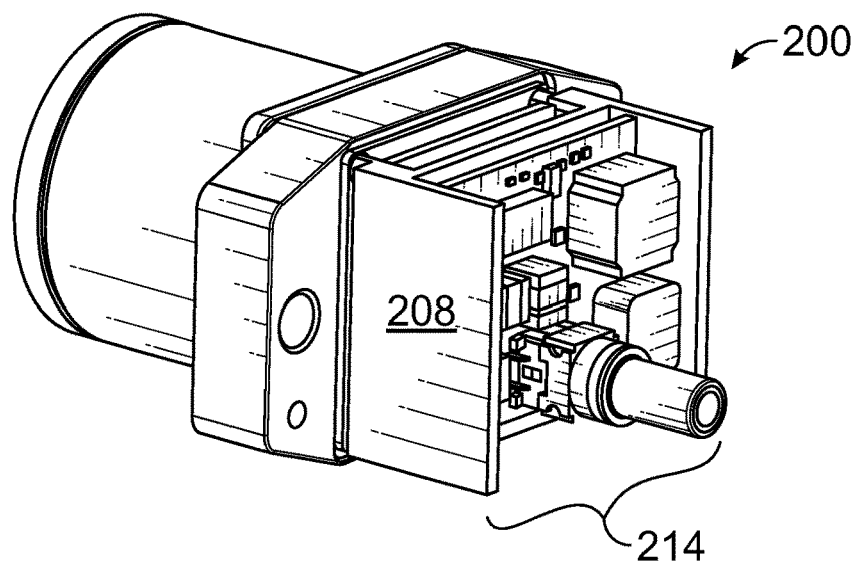
FIG. 7 illustrates electronic components inserted into a component section of a thermal camera prior to the performance of a thermoplastic injection in accordance with an embodiment of the disclosure.
Figure 8:
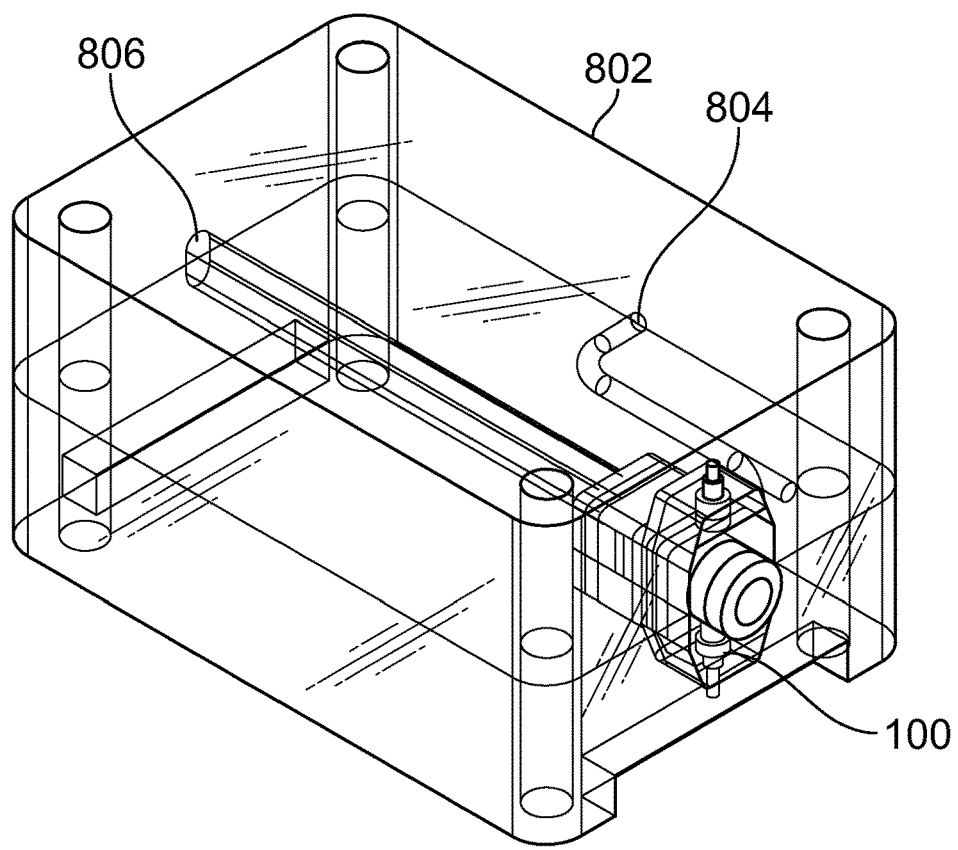
FIG. 8 illustrates a thermal camera in a thermoplastic mold in accordance with an embodiment of the disclosure.

At block 602, electronic components and associated circuit boards 214 are inserted into a frame of thermal camera 200. For example, as shown in FIG. 7, heatsink 208 provides a frame configured to receive electronic components and associated circuit boards 214. At block 604, at least a portion of thermal camera 200 is placed into a thermoplastic mold. For example, FIG. 8 illustrates thermal camera 200 positioned in a thermoplastic mold 802. At block 606, heated thermoplastic material 210 is injected into thermoplastic mold 802. For example, as shown in FIG. 8, thermoplastic mold 802 includes an input port 804 configured to receive heated thermoplastic material 210 and also includes an outlet port configured to vent air from mold 802 as the interior of thermoplastic mold 802 is filled with thermoplastic material 210 during block 608.

Figure 9:
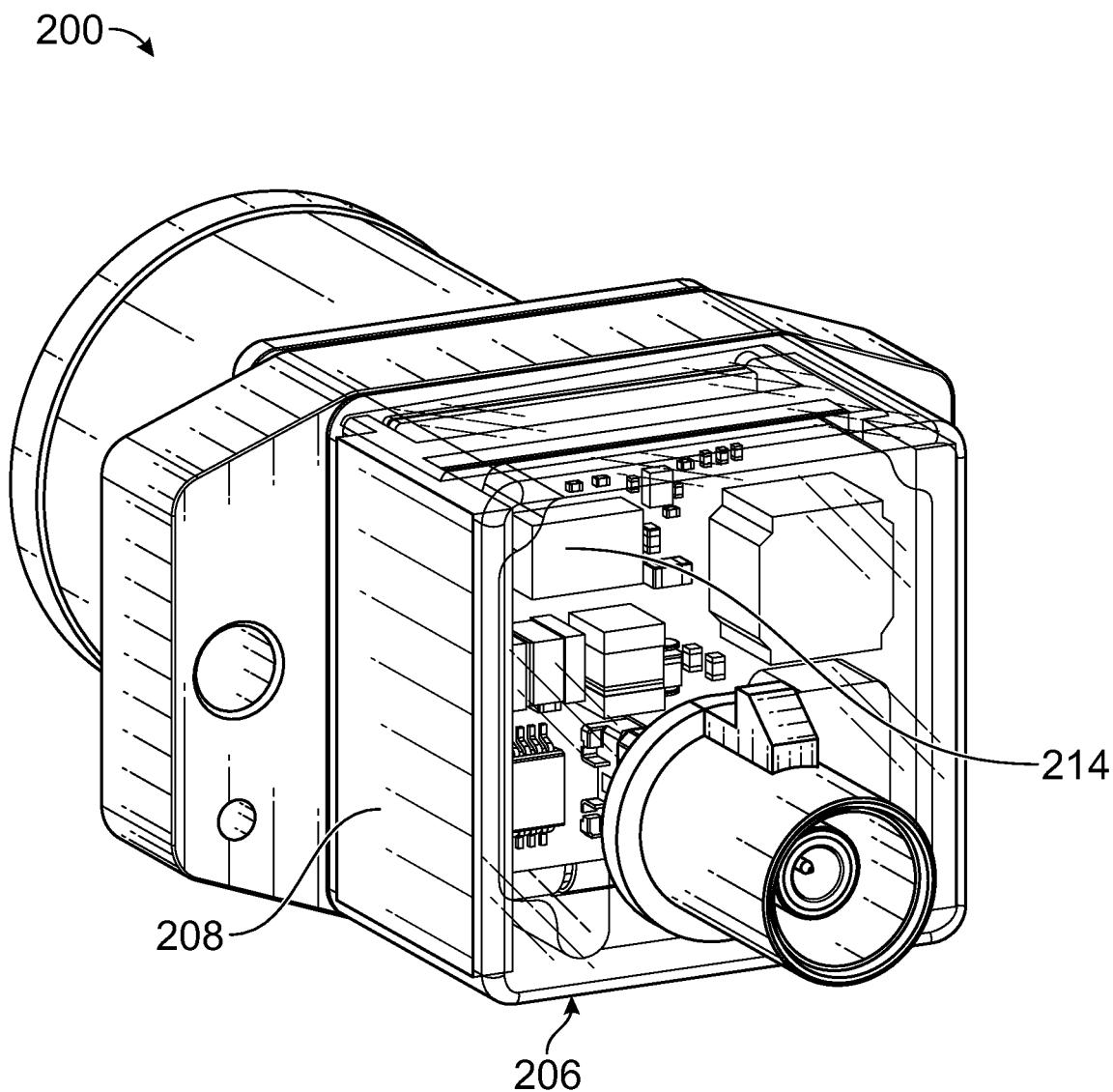
FIG. 9 illustrates an overmolded solid enclosure, shown in transparent form, for a thermal camera in accordance with an embodiment of the disclosure.

At block 608, the now molded thermal camera 200 is removed from thermoplastic mold 802. In this regard, FIG. 9 illustrates thermal camera 200 following the molding with overmolded solid enclosure 206 shown in transparent form to illustrate electronic components and associated circuit boards 214 disposed therein. At block 610, the completed thermal camera 200 is tested.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   placing at least a portion of a thermal imaging system comprising a plurality of exposed electronic components into a mold; and
   injecting a thermoplastic material into the mold to deposit the thermoplastic material onto the electronic components and encapsulate the electronic components in an overmolded solid enclosure formed by the thermoplastic material.

2. The method of claim 1, wherein:
   the thermal imaging system further comprises a heatsink configured to dissipate heat associated with the electronic components;
   at least a portion of the heatsink is exposed to an external environment following the injecting; and the thermoplastic material seals the heatsink to the overmolded solid enclosure.

3. The method of claim 1, wherein the thermal imaging system further comprises an optical assembly and a thermal imager that are not encapsulated by the thermoplastic material.

4. The method of claim 3, wherein the optical assembly and the thermal imager are disposed in a first portion of the thermal imaging system, wherein the overmolded solid enclosure formed by the thermoplastic material provides a second portion of the thermal imaging system, wherein the thermoplastic material seals the second portion to the first portion.

5. The method of claim 4, wherein the overmolded solid enclosure formed by the thermoplastic material reduces an internal air volume of the thermal imaging system and is waterproof to permit the electronic components of the second portion to be operated without a breathable vent.

6. The method of claim 1, wherein the thermal imaging system further comprises a connector configured to interface between at least one of the electronic components and an external device, wherein the injecting comprises encapsulating a portion of the connector by the thermoplastic material in the overmolded solid enclosure to secure the connector to the thermal imaging system.

7. The method of claim 1, wherein the injecting is performed at a pressure less than 50 bars to prevent the electronic components from being displaced during the injecting.

8. The method of claim 1, wherein the thermoplastic material is at least one of a polyamide and/or a polyolefin to provide greater thermal conductivity and greater electrical insulation than air.

9. The method of claim 1, wherein the thermoplastic material permits the electronic components to be operated over a temperature range of at least −40 degrees C. to at least +85 degrees C.

10. The method of claim 1, wherein the thermal imaging system is configured to be mounted to a vehicle.

11. The method of claim 1, further comprising removing the thermal imaging system from the mold and testing the thermal imaging system.

12. A method comprising:
inserting exposed electronic components of a camera and associated circuit boards of the camera into a frame of the camera, wherein the camera is a thermal camera;
after the inserting, placing at least a portion of the camera into a thermoplastic mold; and
injecting thermoplastic material into the thermoplastic mold to encapsulate the electronic components in an overmolded solid enclosure formed by the thermoplastic material.

13. The method of claim 12, wherein the frame is provided by a heatsink configured to dissipate heat associated with the electronic components.

14. The method of claim 13, wherein at least part of the heatsink is exposed to an external environment following the injecting.

15. The method of claim 12, wherein the thermoplastic material is injected in a heated state.

16. The method of claim 12, wherein the camera comprises a connector configured to interface between at least one of the electronic components and an external device, wherein the injecting comprises encapsulating a portion of the connector by the thermoplastic material in the overmolded solid enclosure to secure the connector to the camera.

17. The method of claim 16, wherein the connector is a Fakra coaxial connector.

18. The method of claim 12, wherein the camera is waterproof.

19. The method of claim 12, further comprising removing the camera from the mold and testing the camera.

* * * * *